(12) United States Patent
Modeki (10) Patent No.: US 10,938,009 B2
(45) Date of Patent: Mar. 2, 2021

(54) BATTERY

(71) Applicant: NEC ENERGY DEVICES, LTD., Sagamihara (JP)

(72) Inventor: Akihiro Modeki, Kanagawa (JP)

(73) Assignee: Envision AESC Energy Devices Ltd., Sagamihara (JP)

( * ) Notice: Subject to any disclaimer, the term of this patent is extended or adjusted under 35 U.S.C. 154(b) by 137 days.

(21) Appl. No.: 15/526,389

(22) PCT Filed: May 28, 2015

(86) PCT No.: PCT/JP2015/065412
§ 371 (c)(1),
(2) Date: May 12, 2017

(87) PCT Pub. No.: WO2016/084410
PCT Pub. Date: Jun. 2, 2016

(65) Prior Publication Data
US 2017/0331091 A1    Nov. 16, 2017

(30) Foreign Application Priority Data

Nov. 27, 2014  (JP) .............................. JP2014-240551

(51) Int. Cl.
*H01M 2/16* (2006.01)
*H01M 2/18* (2006.01)
(Continued)

(52) U.S. Cl.
CPC ............... *H01M 2/16* (2013.01); *H01M 2/14* (2013.01); *H01M 2/1653* (2013.01);
(Continued)

(58) Field of Classification Search
None
See application file for complete search history.

(56) References Cited

U.S. PATENT DOCUMENTS

2011/0244304 A1* 10/2011 Shinyashiki ............ H01M 2/16
   429/139
2012/0321932 A1* 12/2012 Ise ...................... H01M 2/1673
   429/144
(Continued)

FOREIGN PATENT DOCUMENTS

GB       1536498 A    12/1978
JP    55-122363 A     9/1980
(Continued)

OTHER PUBLICATIONS

International Search Report of PCT/JP2015/065412 dated Aug. 11, 2015.
(Continued)

*Primary Examiner* — Amanda J Barrow
(74) *Attorney, Agent, or Firm* — Sughrue Mion, PLLC (57) ABSTRACT

A first separator (130) covers a first surface of a cathode electrode (110). The first separator (130) has a melting point of a first temperature. A second separator (140) covers a second surface of the cathode electrode (110). The second separator (140) has a melting point of a second temperature higher than the first temperature. An adhesive layer (132) is formed by melting a portion of the first separator (130). The adhesive layer (132) pastes the first separator (130) and the second separator (140) to each other.

1 Claim, 13 Drawing Sheets (51) Int. Cl.
*H01M 6/02* (2006.01)
*H01M 10/04* (2006.01)
*H01M 2/14* (2006.01)
*H01M 10/0585* (2010.01)

(52) U.S. Cl.
CPC ........... *H01M 2/1686* (2013.01); *H01M 2/18* (2013.01); *H01M 6/02* (2013.01); *H01M 10/04* (2013.01); *H01M 10/0585* (2013.01)

(56) References Cited

U.S. PATENT DOCUMENTS

| | | | |
|---|---|---|---|
| 2013/0236767 A1 | 9/2013 | Nishikawa et al. | |
| 2013/0252074 A1* | 9/2013 | Hsiao | H01M 2/1016 429/159 |
| 2013/0302660 A1* | 11/2013 | Shiraishi | H01M 2/34 429/120 |
| 2014/0154547 A1* | 6/2014 | Anderson | H01M 10/0413 429/120 |
| 2014/0255780 A1* | 9/2014 | Mikhaylik | H01M 4/139 429/213 |
| 2014/0295242 A1* | 10/2014 | Kimura | H01M 2/1072 429/120 |
| 2014/0321093 A1* | 10/2014 | Pande | H01G 11/22 361/807 |
| 2016/0197372 A1* | 7/2016 | Sawada | H01M 2/1686 429/246 |

FOREIGN PATENT DOCUMENTS

| | | | | |
|---|---|---|---|---|
| JP | 61-080752 A | 4/1986 | | |
| JP | 63-078460 A | 4/1988 | | |
| JP | 63-202853 A | 8/1988 | | |
| JP | 04-196053 A | 7/1992 | | |
| JP | 2007-287724 A | 11/2007 | | |
| JP | 2011-210524 A | 10/2011 | | |
| JP | 2012-151036 A | 8/2012 | | |
| JP | 2014-002858 A | 1/2014 | | |
| JP | 2014-017159 | * | 1/2014 | .............. H01M 2/18 |
| JP | 2014-017159 A | 1/2014 | | |
| WO | 2012/060231 A1 | 5/2012 | | |
| WO | 2014/042397 A2 | 3/2014 | | |
| WO | WO 2014/103594 | * | 7/2014 | ........... H01M 10/04 |

OTHER PUBLICATIONS

Communication dated Jun. 25, 2018 from the European Patent Office in application No. 15862825.5.

* cited by examiner

BATTERY

CROSS REFERENCE TO RELATED APPLICATIONS

This application is a National Stage of International Application No. PCT/JP2015/065412 filed May 28, 2015, claiming priority based on Japanese Patent Application No. 2014-240551 filed Nov. 27, 2014, the contents of all of which are incorporated herein by reference in their entirety.

TECHNICAL FIELD

The present invention relates to a battery.

BACKGROUND ART

In some case, a battery has a lamination of a cathode electrode, a separator, and an anode electrode. For example, Patent Document 1 and Patent Document 2 disclose that the cathode electrode or the anode electrode is places between two separators. Specifically, in Patent Document 1, a thermoplastic resin is provided between the two separators. In this case, the thermoplastic resin is melted by heating the separators. The two separators are pasted to each other by the thermoplastic resin.

Patent Document 3 discloses a method of preventing, where the cathode electrode is located between two first separators pasted together and a temperature of the battery raises, the two first separators from shrinking. Specifically, in Patent Document 3, a second separator is provided between each first separator and the anode electrode. The second separator has a melting point lower than that of the first separator. Patent Document 3 discloses that, in this case, the first separator is prevented from shrinking even when the temperature of the battery rises.

RELATED DOCUMENTS

Patent Documents

[Patent Document 1] Japanese Unexamined Patent Publication No. 61-80752
[Patent Document 2] Japanese Unexamined Patent Publication No. 2007-287724
[Patent Document 3] Japanese Unexamined Patent Publication No. 2012-151036

SUMMARY OF THE INVENTION

As described above, in some case, in the battery, the cathode electrode or the anode electrode is located between two separators pasted together. In the battery having such a structure, in order to enhance heat resistance between the cathode electrode and the anode electrode, it is preferable to provide a separator of a high melting point between the cathode electrode and the anode electrode. The inventor has examined a structure for providing the separator of a high melting point between the cathode electrode and the anode electrode.

A purpose of the present invention is to provide, in a battery including the cathode electrode or the anode electrode between two separators pasted together, a separator of a high melting point between the cathode electrode and the anode electrode by a novel structure.

According to the present invention, there is provided a battery including: a first electrode having a first surface and a second surface which is a surface opposite to the first surface; a first separator covering the first surface, and having a melting point of a first temperature; a second separator covering the second surface, and having a melting point of a second temperature higher than the first temperature; and a first adhesive layer formed by melting a portion of the first separator, and pasting the first separator and the second separator to each other.

According to the present invention, it is possible to provide, in a battery including the cathode electrode or the anode electrode between two separators pasted together, a separator of a high melting point between the cathode electrode and the anode electrode by a novel structure.

BRIEF DESCRIPTION OF THE DRAWINGS

The above and other objects, features, and advantages will be made clearer from preferred embodiments described below, and the following accompanying drawings.

DESCRIPTION OF EMBODIMENTS

Hereinafter, embodiments of the present invention will be described with reference to the accompanying drawings. In all the drawings, like elements are referenced by like reference numerals and the descriptions thereof will not be repeated.

First Embodiment

Figure 1:
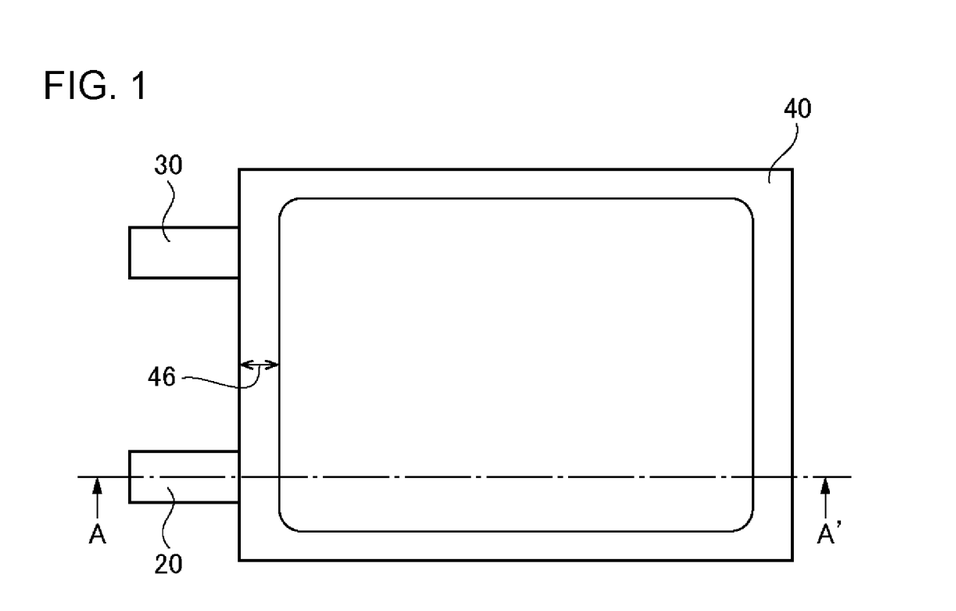
FIG. 1 is a plan view illustrating a configuration of a battery according to a first embodiment.
Figure 2:
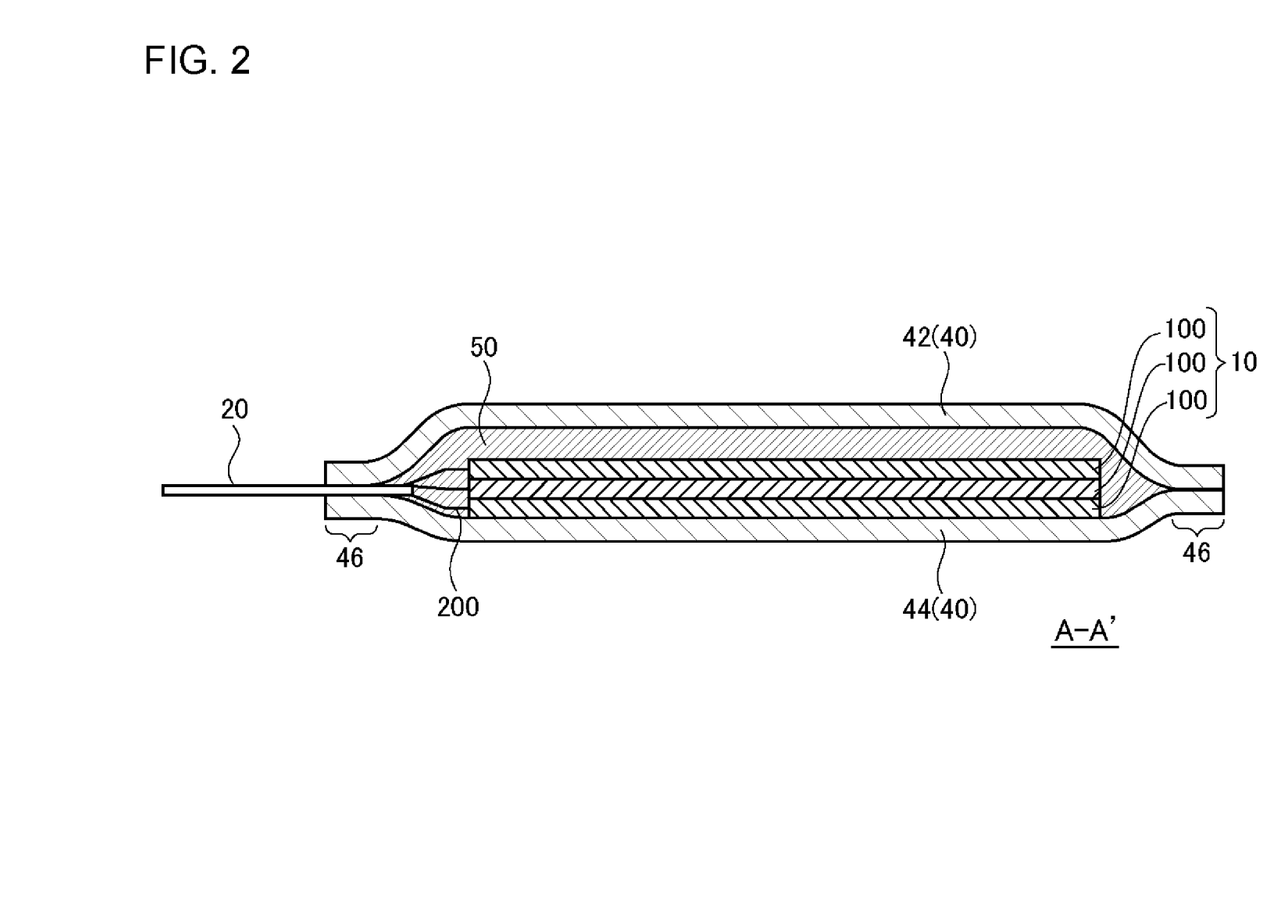
FIG. 2 is a cross-sectional view taken along line A-A' of FIG. 1.

FIG. 1 is a plan view illustrating a configuration of a battery according to a first embodiment. FIG. 2 is a cross-sectional view taken along line A-A' of FIG. 1. This battery includes a laminate 10, a cathode tab 20, an anode tab 30, a cover member 40, and an electrolytic solution 50.

The cover member 40 includes opposite covers 42 and 44. The planar shape of the cover member 40 is a rectangle having long sides and short sides. The covers 42 and 44 include a sealing region 46 located along each side of the cover member 40. The covers 42 and 44 are pasted to each other at the sealing region 46. Thereby, the region between the covers 42 and 44 is sealed from an external region. The covers 42 and 44 are formed using, for example, an aluminum film.

The laminate 10 and the electrolytic solution 50 are located in a space sealed by the cover member 40. The laminate 10 includes a plurality of unit cells 100 (described later in detail with reference to FIG. 3) laminated to each other. The electrolytic solution 50 is a nonaqueous electrolytic solution. Specifically, the electrolytic solution 50 includes lithium salt and organic solvents.

The aforementioned lithium salt is, for example, $LiClO_4$, $LiBF_6$, $LiPF_6$, $LiCF_3SO_3$, $LiCF_3CO_2$, $LiAsF_6$, $LiSbF_6$, $LiB_{10}Cl_{10}$, $LiAlCl_4$, LiCl, LiBr, $LiB(C_2H_5)_4$, $CF_3SO_3Li$, $CH_3SO_3Li$, $LiC_4F_9SO_3$, $Li(CF_3SO_2)_2N$, or low fatty acid lithium carboxylate.

Examples of materials of the aforementioned organic solvents include carbonates such as ethylene carbonate (EC), propylene carbonate (PC), butylene carbonate (BC), dimethyl carbonate (DMC), diethyl carbonate (DEC), methyl ethyl carbonate (MEC), and vinylene carbonate (VC); lactones such as γ-butyrolactone and γ-valerolactone; ethers such as trimethoxy methane, 1,2-dimethoxyethane, diethyl ether, tetrahydrofuran, and 2-methyltetrahydrofuran; sulfoxides such as dimethyl sulfoxide; oxolanes such as 1,3-dioxolane and 4-methyl-1,3-dioxolane; nitrogen-containing solvents such has acetonitrile, nitromethane, formamide, and dimethyl formamide; organic acid esters such as methyl formate, methyl acetate, ethyl acetate, butyl acetate, methyl propionate, and ethyl propionate; esters such as triester phosphate; diglymes; triglymes; sulfolanes such as sulfolane and methyl sulfolane; oxazolidinones such as 3-methyl-2-oxazolidinone; and sultones such as 1,3-propane sultone, 1,4-butane sultone, and naphtha sultone. The aforementioned organic solvents may include only one kind of these materials, or may include two or more kinds of these materials.

In the example shown in FIG. 1, the cathode tab 20 and the anode tab 30 protrude outward from the same short side of the cover member 40 when seen in a plan view. The cathode tab 20 and the anode tab 30 are located on the opposite sides to each other along this side. Thereby, it is possible to prevent short circuit between the cathode tab 20 and the anode tab 30. The cathode tab 20 and the anode tab 30 are electrically connected to the unit cells 100 through a cathode lead 200 and an anode lead 300 (described later with reference to FIG. 3), respectively.

Figure 3A:
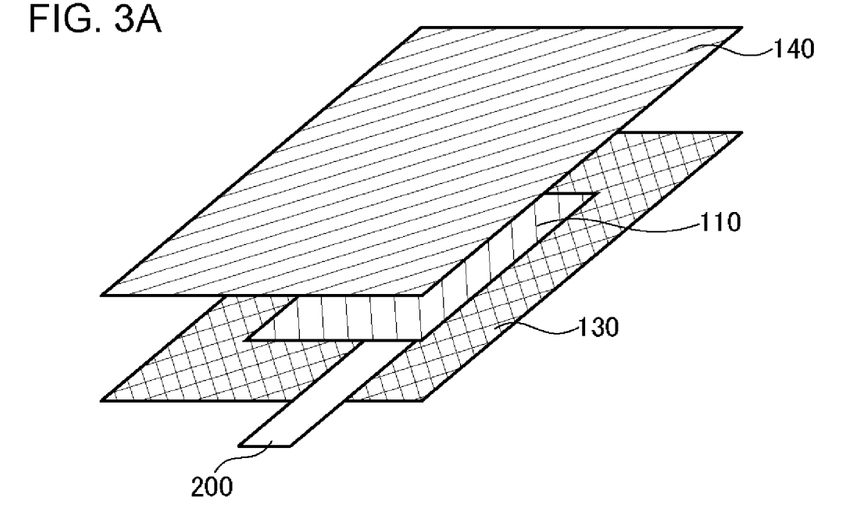
FIG. 3 is an exploded perspective view illustrating a configuration of a unit cell shown in FIG. 2.
Figure 3B:
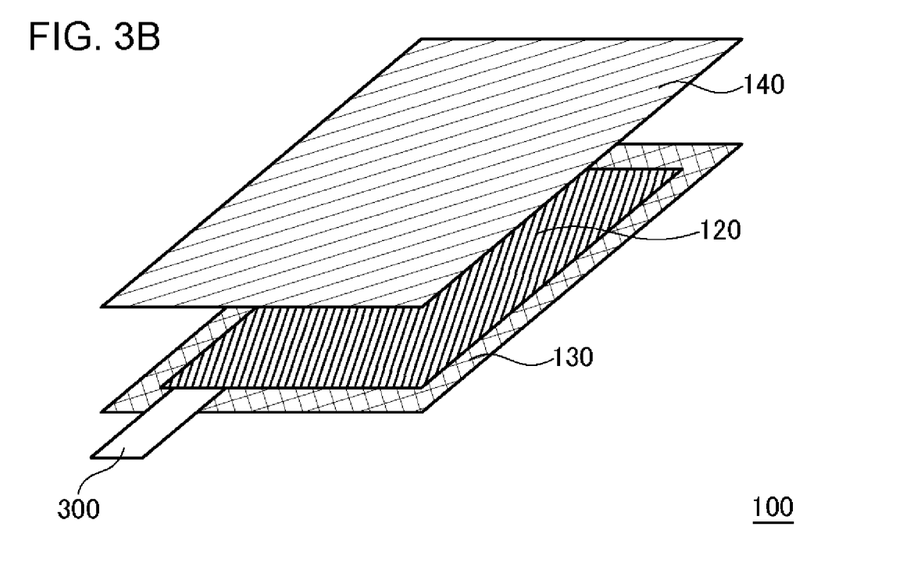

FIG. 3 is an exploded perspective view illustrating a configuration of the unit cell 100 shown in FIG. 2. As shown in the drawing, the unit cell 100 includes a cathode electrode 110, an anode electrode 120, a first separator 130, a second separator 140, the cathode lead 200, and the anode lead 300. The cathode lead 200 is electrically connected to the cathode electrode 110. Similarly, the anode lead 300 is electrically connected to the anode electrode 120. For ease of designation, the second separator 140 in FIG. 3A corresponds to "a fourth separator", the first separator 130 in FIG. 3A corresponds to "a third separator", the second separator 140 in FIG. 3B corresponds to "a second separator", and the first separator 130 in FIG. 3B corresponds to "the first separator" as utilized in the claims. Alternatively, the second separator 140 in FIG. 3A corresponds to "a second separator", the first separator 130 in FIG. 3A corresponds to "a first separator", the second separator 140 in FIG. 3B corresponds to "a fourth separator", and the first separator 130 in FIG. 3B corresponds to "the third separator" as utilized in the claims.

In the example shown in the drawing, the first separator 130, the anode electrode 120, the second separator 140, the first separator 130, the cathode electrode 110, and the second separator 140 are laminated in this order. Specifically, as described later with reference to FIG. 4, the cathode electrode 110 is located between the first separator 130 and the second separator 140 pasted to each other. Similarly, the anode electrode 120 is located between the first separator 130 and the second separator 140 pasted to each other.

In the example shown in the drawing, in the laminate 10 shown in FIG. 2, the first separator 130, the anode electrode 120, the second separator 140, the first separator 130, the cathode electrode 110, and the second separator 140 are repeatedly laminated in this order. In this case, the removal of the cathode electrode 110 and the anode electrode 120 from the laminate 10 leads to the first separator 130 and the second separator 140 being alternately laminated. In this case, it is possible to prevent the first separator 130 and the second separator 140 from being unevenly distributed.

In the example shown in the drawing, the first separator 130 and the second separator 140 on opposite sides of the cathode electrode 110, and the first separator 130 and the second separator 140 on opposite sides of the anode electrode 120 all have the same planar shape. The first separator 130 and the second separator 140 on opposite sides of the cathode electrode 110 include the cathode electrode 110 inside when seen in a plan view. A portion of the cathode lead 200 protrudes outside of a region overlapping the first separator 130 and the second separator 140. Similarly, the first separator 130 and the second separator 140 on opposite sides of the anode electrode 120 include the anode electrode 120 inside when seen in a plan view. A portion of the anode lead 300 protrudes outside of the region overlapping the first separator 130 and the second separator 140.

In the example shown in the drawing, the cathode electrode 110 is included inside the anode electrode 120 when seen in a plan view. In this case, even when the disposition of the cathode electrode 110 slightly shifts, it is possible to prevent change of an area of a region in which the cathode electrode 110 and the anode electrode 120 overlap each other.

The cathode electrode 110 includes cathode active materials. Specifically, examples of the cathode active materials include composite oxides of lithium and a transition metal such as a lithium-nickel composite oxide, a lithium-cobalt composite oxide, a lithium-manganese composite oxide, and a lithium-manganese-nickel composite oxide; transition metal sulfides such as $TiS_2$, FeS, and $MoS_2$; transition metal oxides such as MnO, $V_2O_5$, $V_6O_{13}$, $TiO_2$, and the like, or olivine type lithium phosphorous oxides. The anode electrode 120 includes anode active materials. Specifically, examples of the anode active materials include carbon materials such as artificial graphite, natural graphite, amorphous carbon, diamond-like carbon, fullerene, carbon nanotube, and carbon nanohorn; lithium metal materials; alloy-based materials such as silicon and tin; oxide-based materials such as $Nb_2O_5$ and $TiO_2$; or a compound of these materials. The cathode lead 200 and the anode lead 300 are formed using a metal (for example, copper or aluminum).

Figure 4A:
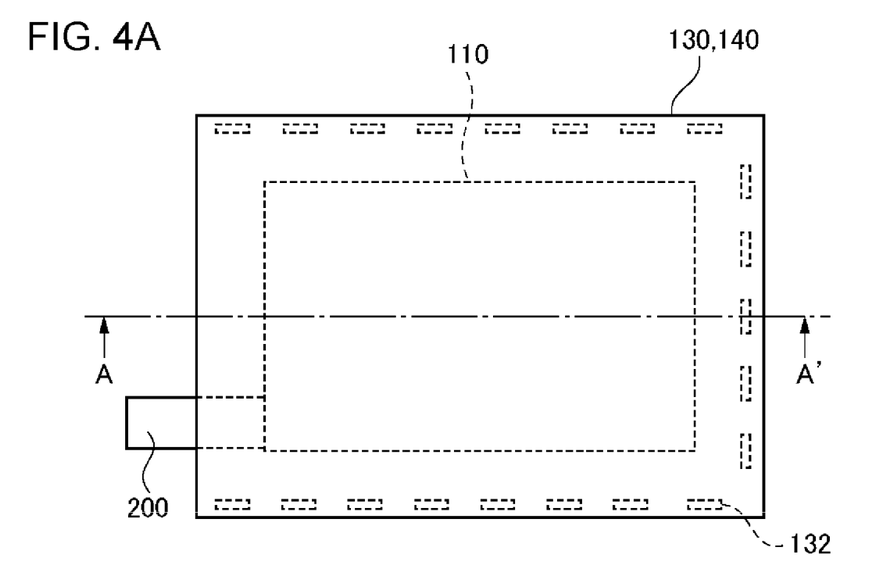
FIG. 4A is a plan view illustrating a configuration of a laminate including a cathode electrode shown in FIG. 3.
Figure 4B:
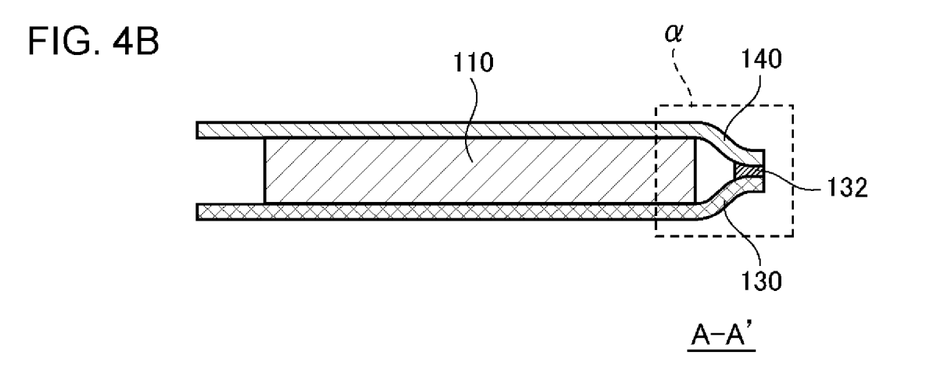
FIG. 4B is a cross-sectional view taken along line A-A' of FIG. 4A.
Figure 5:
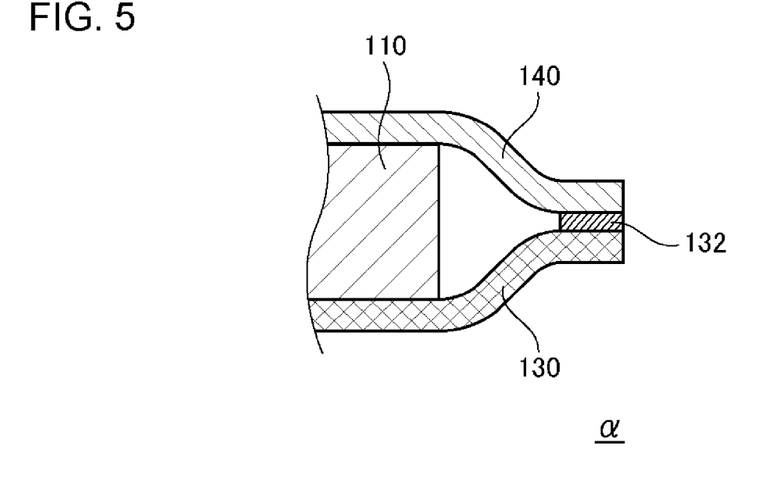
FIG. 5 is an enlarged view of a region surrounded by a broken line a of FIG. 4B.

FIG. 4A is a plan view illustrating a configuration of a laminate including the cathode electrode 110 shown in FIG. 3. FIG. 4B is a cross-sectional view taken along line A-A' of FIG. 4A. FIG. 5 is an enlarged view of a region surrounded by a broken line a of FIG. 4B.

As shown in FIGS. 4B and 5, the first separator 130 and the second separator 140 are pasted to each other by an adhesive layer 132. The adhesive layer 132 is an adhesive layer formed by melting the first separator 130. Specifically, the first separator 130 has a melting point of a first temperature. On the other hand, the second separator 140 has a melting point of a second temperature higher than the first temperature. As described later in detail, the adhesive layer 132 is formed by pressing the second separator 140 against the first separator 130 while the second separator 140 is heated at a third temperature equal to or higher than the first temperature and lower than the second temperature from the opposite side of the first separator 130 across the second separator 140.

In the example shown in FIGS. 4B and 5, the cathode electrode 110 is configured such that one of a first surface and a second surface opposite in a thickness direction is covered with the second separator 140. Thereby, the surface of the cathode electrode 110 covered with the second separator 140 is faces the anode electrode 120 (FIG. 3) across the second separator 140. As described above, the melting point of the second separator 140 is high. Therefore, it is possible to enhance heat resistance between the cathode electrode 110 and the anode electrode 120.

The first temperature is, for example, a temperature equal to or higher than 120° C. and equal to or lower than 250° C. On the other hand, the second temperature is, for example, a temperature equal to or higher than 270° C. and equal to or lower than 400° C. The first separator 130 is formed using a porous resin, and is formed using, for example, polypropylene or polyethylene. On the other hand, the second separator 140 is formed using a porous resin, and is formed using, for example, polyamide or polyimide.

In the example shown in FIG. 4 the planar shape of the first separator 130 and the second separator 140 is a rectangle having long sides and short sides. In the example shown in the drawing, the cathode lead 200 protrudes from one side of the short sides of the first separator 130 and the second separator 140. The adhesive layer 132 is disposed on three sides other than a side from which the cathode lead 200 protrudes. In the example shown in the drawing A when seen in a plan view, a plurality of adhesive layers 132 is disposed in a row along each side.

The structure of the laminate including the anode electrode 120 in FIG. 3 is the same as that of the example shown in FIGS. 4 and 5, except that the cathode electrode 110 serves as the anode electrode 120.

Figure 6A:
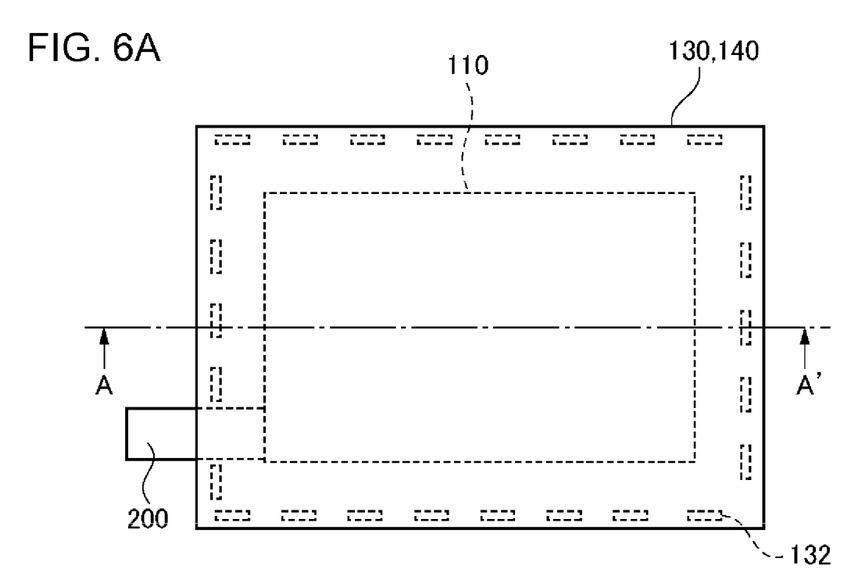
FIG. 6 is a diagram illustrating a first modification example of FIG. 4.
Figure 6B:
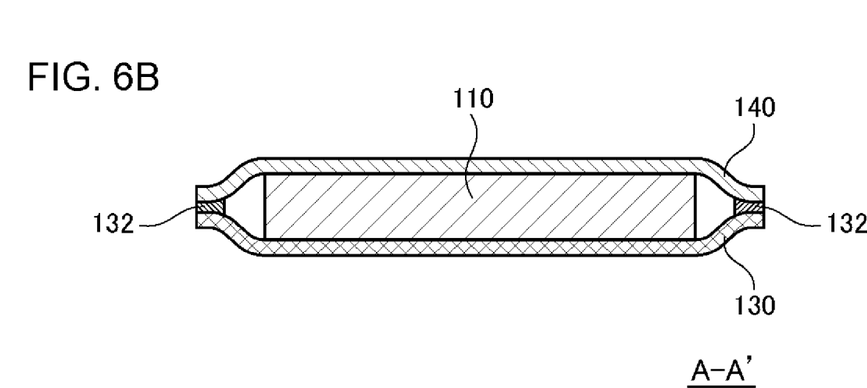

FIG. 6 is a diagram illustrating a first modification example of FIG. 4. As shown in the drawing A the adhesive layer 132 may be disposed on four sides of the first separator 130 and the second separator 140. In the example shown in the drawing A, a plurality of adhesive layers 132 is disposed in a row along each side of the first separator 130 and the second separator 140. In the example shown in the drawing A the adhesive layer 132 is not formed in a region overlapping the cathode lead 200 when seen in a plan view.

Figure 7A:
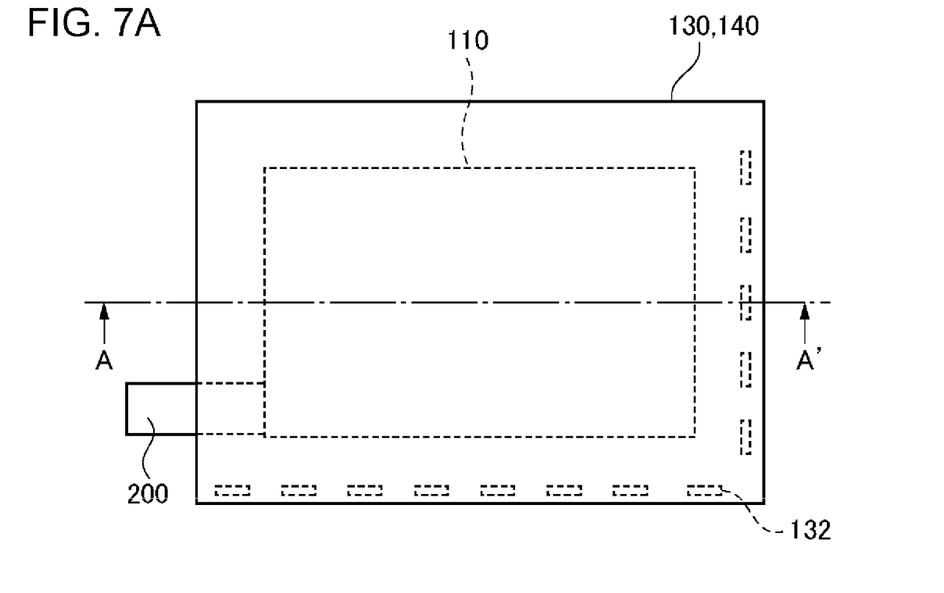
FIG. 7 is a diagram illustrating a second modification example of FIG. 4.
Figure 7B:
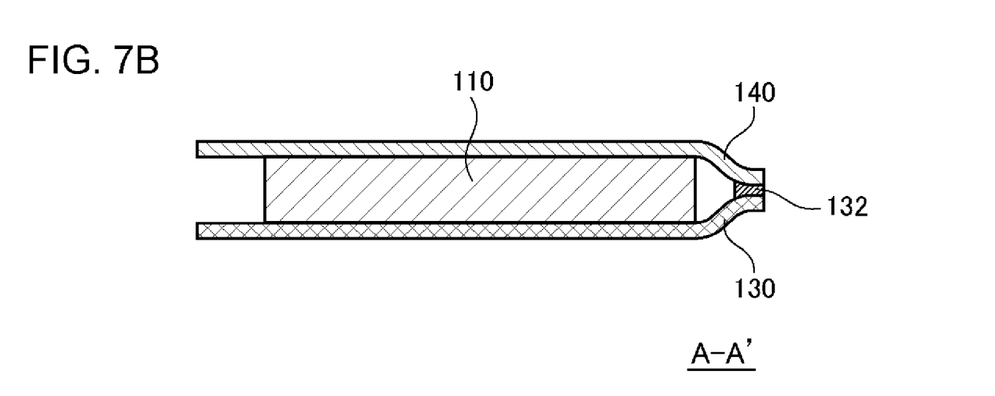

FIG. 7 is a diagram illustrating a second modification example of FIG. 4. As shown in the drawing A, the adhesive layer 132 may be disposed on only two sides of the first separator 130 and the second separator 140. Specifically, in the example shown in the drawing A the adhesive layer 132 is disposed on a short side opposite to a short side from which the cathode lead 200 protrudes, and is disposed on one side of the remaining two sides. A plurality of adhesive layers 132 is disposed in a row along each side.

Figure 8A:
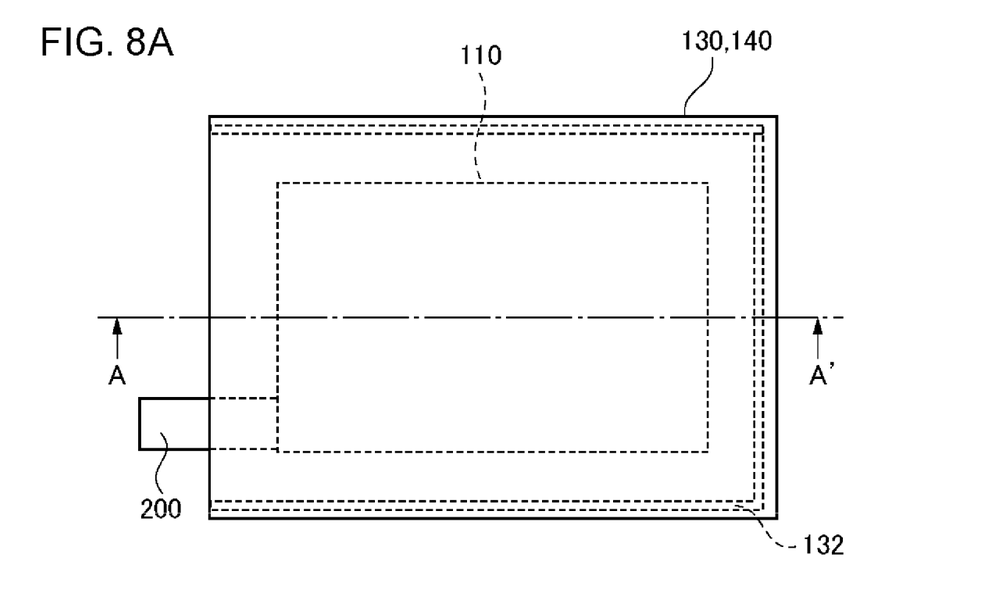
FIG. 8 is a diagram illustrating a third modification example of FIG. 4.
Figure 8B:
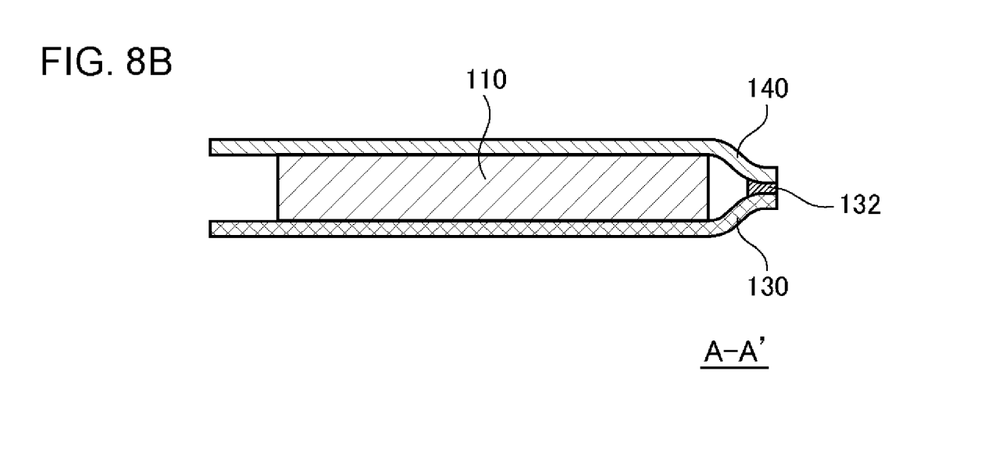

FIG. 8 is a diagram illustrating a third modification example of FIG. 4. As shown in the drawing A the adhesive layer 132 may be continuously formed along each side of the first separator 130 and the second separator 140. In the example shown in the drawing A the adhesive layers 132 continuously formed along each side are connected to each other. In the example shown in the drawing A one end of the adhesive layer 132 formed along its long side reaches the short side from which the cathode lead 200 protrudes.

Figure 9A:
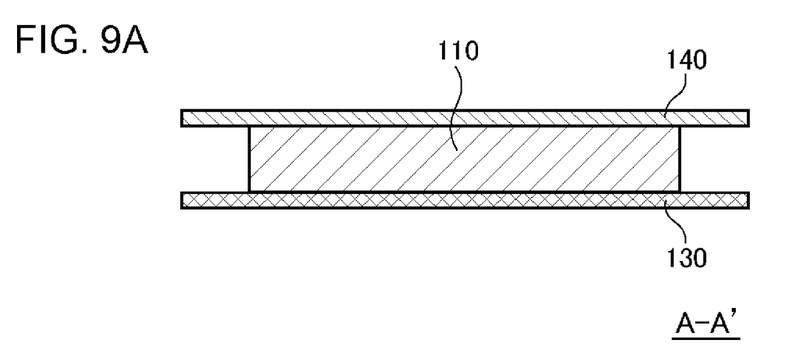
FIG. 9 is a diagram illustrating an example of a method of manufacturing a laminate shown in FIG. 4.
Figure 9B:
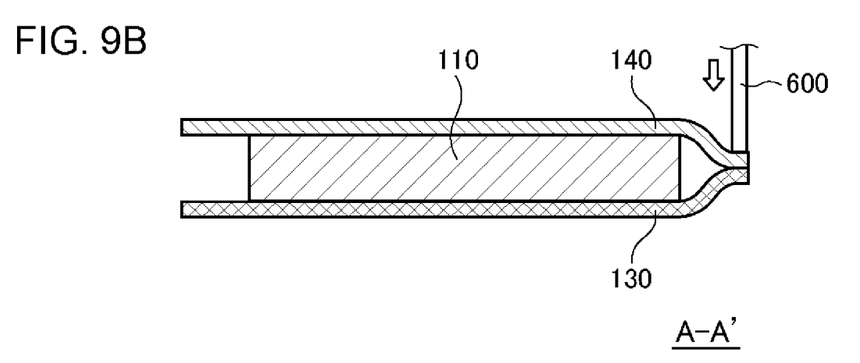

FIG. 9 is a diagram illustrating an example of a method of manufacturing a laminate shown in FIG. 4. First, as shown in the drawing A the first separator 130, the cathode electrode 110, and the second separator 140 are laminated in this order. Next, as shown in the drawing B a press 600 is pressed against the second separator 140 from the opposite side of the first separator 130 across the second separator 140. Thereby, a portion of the second separator 140 is brought into contact with the first separator 130. A tip of the press 600 is heated at the third temperature equal to or higher than the first temperature and lower than the second temperature. In this case, the second separator 140 is not melted. On the other hand, heat (third temperature) on the tip of the press 600 is transmitted to the first separator 130 through the second separator 140. Thereby, a portion of the first separator 130 in contact with the second separator 140 is melted. Thereby, the adhesive layer 132 (FIG. 4) is formed. Assuming the first temperature is T1[° C.], the third temperature is, for example, a temperature equal to or higher than (T1+5°) C. and equal to or lower than (T1+50°) C. More specifically, the third temperature is, for example, a temperature equal to or higher than 125° C. and equal to or lower than 300° C.

As described above, according to the present embodiment, the first separator 130 having a low melting point and the second separator 140 having a high melting point are pasted to each other. In this case, the first separator 130 and the second separator 140 can be pasted to each other by the adhesive layer 132 formed by melting the first separator 130. The cathode electrode 110 is located between the first separator 130 and the second separator 140. In this case, the anode electrode 120 located on the opposite side of the cathode electrode 110 across the second separator 140 faces the cathode electrode 110 across the second separator 140. Thereby, it is possible to enhance heat resistance between the cathode electrode 110 and the anode electrode 120.

Second Embodiment

Figure 10:
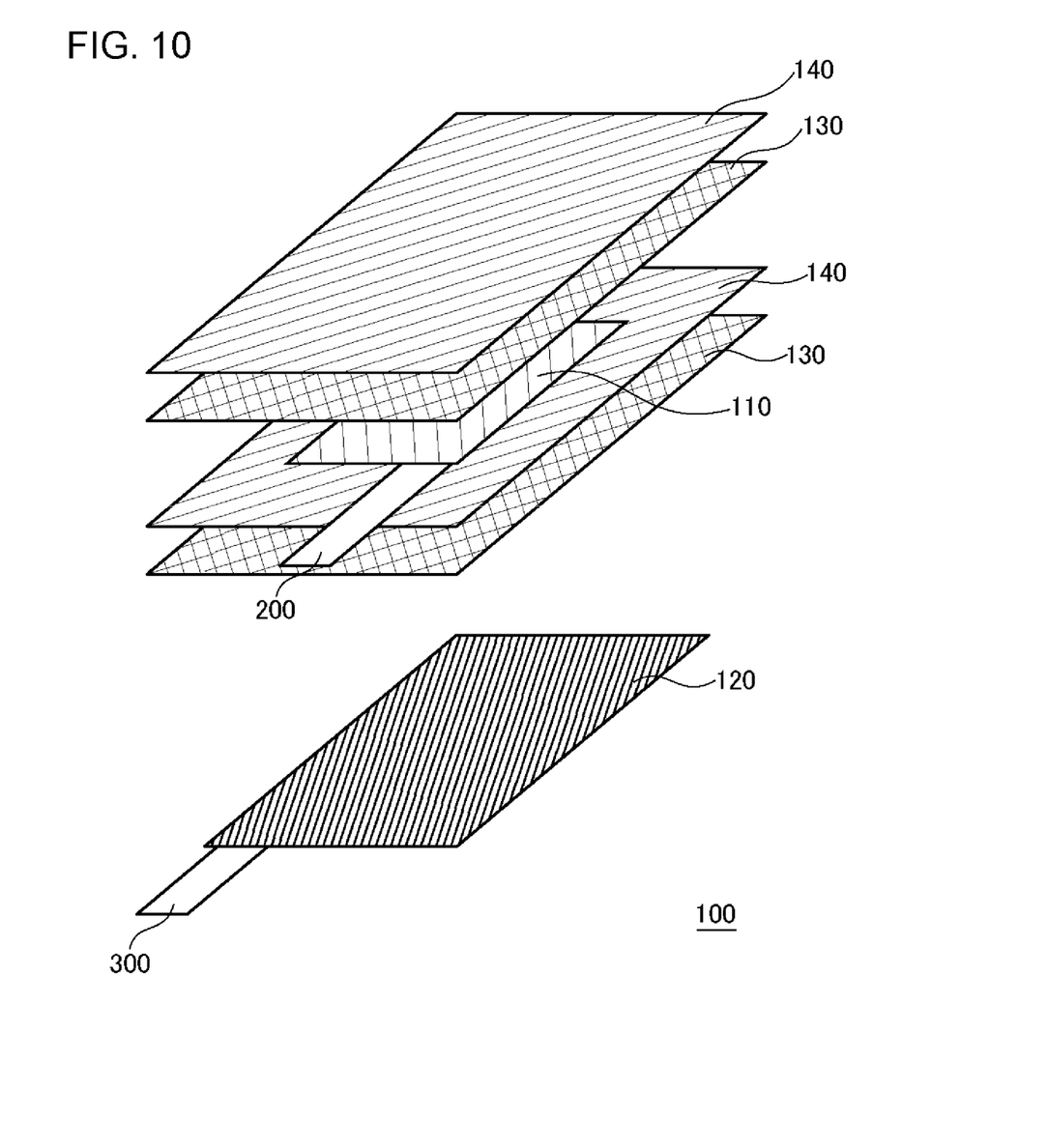
FIG. 10 is an exploded perspective view illustrating a configuration of a unit cell used in a battery according to a second embodiment.

FIG. 10 is an exploded perspective view illustrating a configuration of a unit cell 100 used in a battery according to a second embodiment, and corresponds to FIG. 3 of the first embodiment. The battery according to the present embodiment has the same configuration as that of the battery according to the first embodiment, except for the following points.

In the example shown in the drawing, an anode electrode 120, a first separator 130, a second separator 140, a cathode electrode 110, a first separator 130, and a second separator 140 are laminated in this order. Specifically, as described later with reference to FIG. 11, the cathode electrode 110 is located between the first separator 130 and the second separator 140 pasted to each other. The second separator 140 is pasted to the first separator 130 that covers one surface of the cathode electrode 110. The first separator 130 is pasted to the second separator 140 that covers the other surface of the cathode electrode 110.

In the example shown in the drawing, when seen in a plan view, the cathode electrode 110 is included inside the anode electrode 120. In this case, even when the disposition of the cathode electrode 110 slightly shifts, it is possible to prevent change of an area of a region in which the cathode electrode 110 and the anode electrode 120 overlap each other.

In the example shown in the drawing, in the laminate 10 shown in FIG. 2, the anode electrode 120, the first separator 130, the second separator 140, the cathode electrode 110, the first separator 130, and the second separator 140 are repeatedly laminated in this order. In this case, the removal of the cathode electrode 110 and the anode electrode 120 from the laminate 10 leads to the first separator 130 and the second separator 140 being alternately laminated. In this case, it is possible to prevent the first separator 130 and the second separator 140 from being unevenly distributed.

Figure 11A:
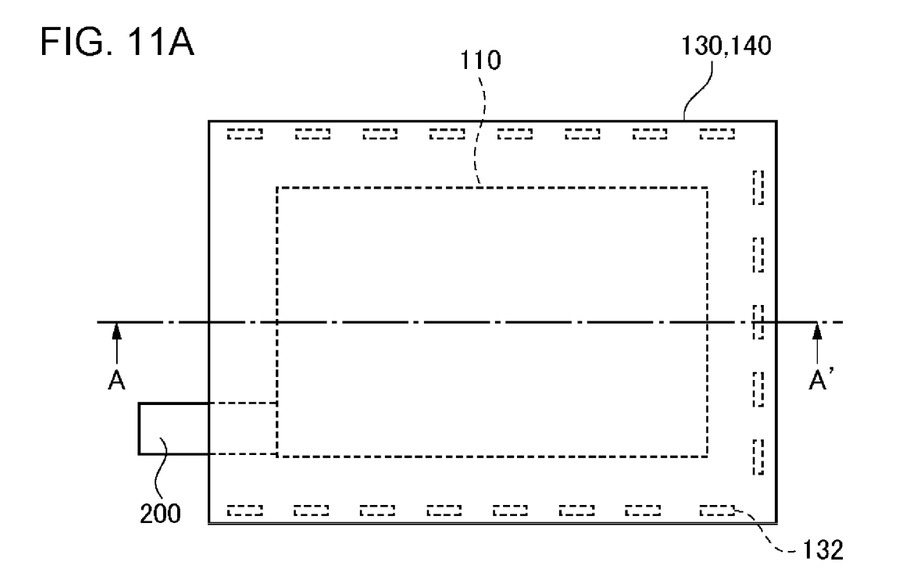
FIG. 11A is a plan view illustrating a configuration of a laminate including a cathode electrode shown in FIG. 10.
Figure 11B:
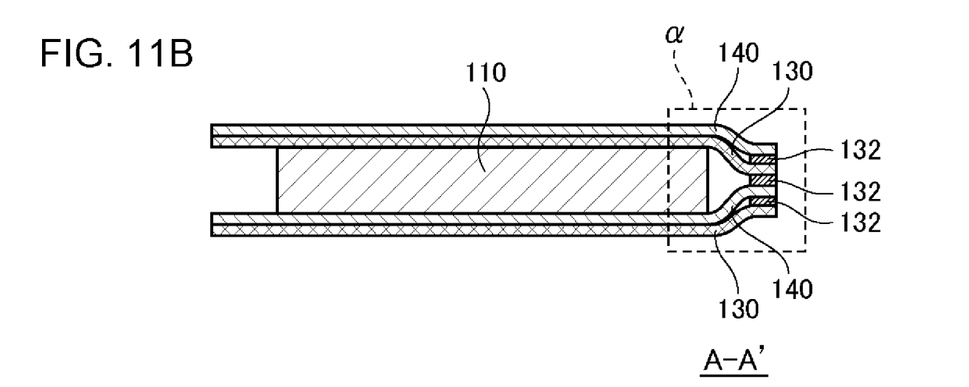
FIG. 11B is a cross-sectional view taken along line A-A' of FIG. 11A.
Figure 12:
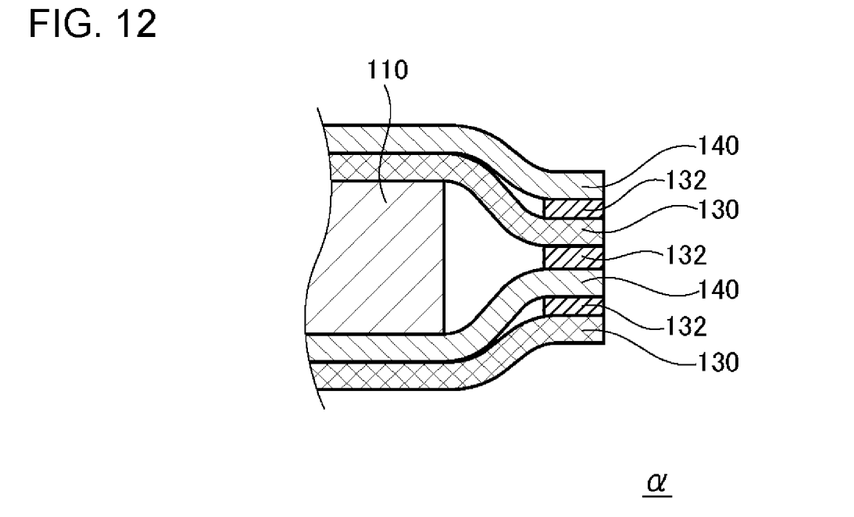
FIG. 12 is an enlarged view of a region surrounded by a broken line a of FIG. 11B.

FIG. 11A is a plan view illustrating a configuration of a laminate including the cathode electrode 110 shown in FIG. 10. FIG. 11B is a cross-sectional view taken along line A-A' of FIG. 11A. FIG. 12 is an enlarged view of a region surrounded by a broken line a of FIG. 11B.

As shown in FIGS. 11B and 12, the first separator 130 and the second separator 140 on opposite sides of the cathode electrode 110 are pasted to each other by the adhesive layer 132. The second separator 140 located at the uppermost layer of this laminate is pasted to the first separator 130 by another adhesive layer 132. The first separator 130 located at the lowermost layer of this laminate is pasted to the second separator 140 by another adhesive layer 132. As described later with reference to FIG. 13, any of the adhesive layers 132 is an adhesive layer formed by melting the first separator 130.

Figure 13A:
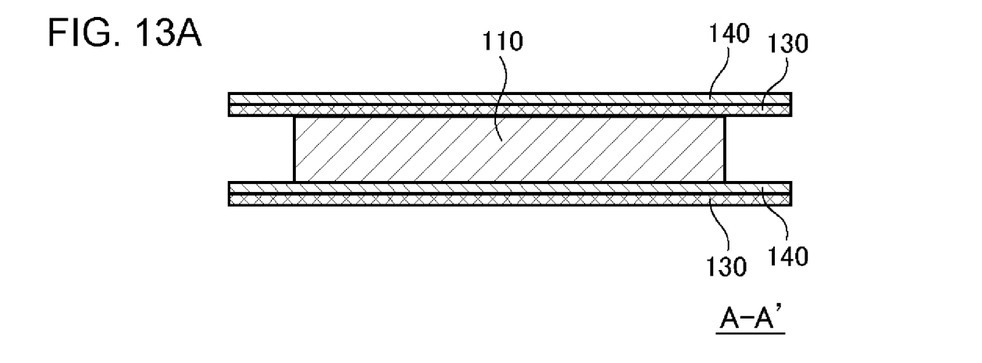
FIG. 13 is a diagram illustrating a method of manufacturing a laminate shown in FIG. 11.
Figure 13B:
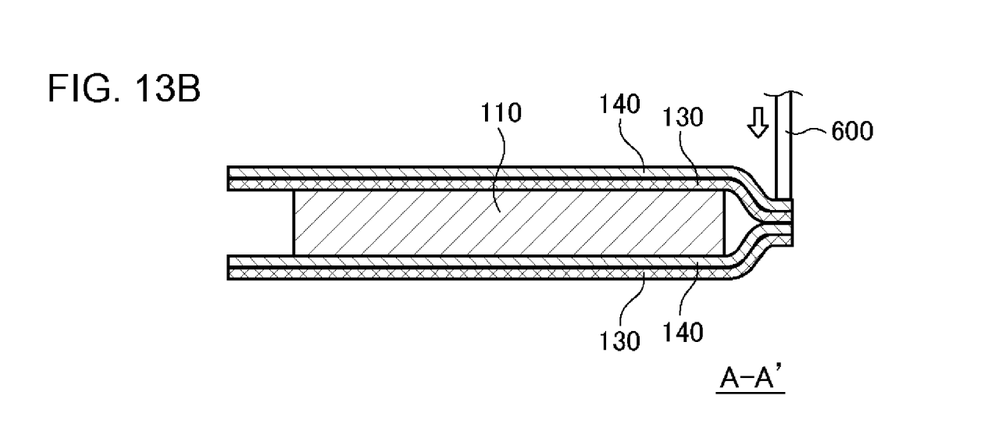

FIG. 13 is a diagram illustrating a method of manufacturing a laminate shown in FIG. 11. First, as shown in the drawing A the first separator 130, the second separator 140, the cathode electrode 110, the first separator 130, and the second separator 140 are laminated in this order. Next, as shown in the drawing B a press 600 is pressed against the second separator 140 located at the uppermost layer of this laminate. A tip of the press 600 is heated at the third temperature equal to or higher than the first temperature and lower than the second temperature. In this case, in a portion pressed by the press 600, the second separator 140 is melted. Thereby, the adhesive layer 132 (FIG. 11) is formed between the adjacent first separator 130 and second separator 140.

In example shown in the drawing, any of the adhesive layers 132 (for example, adhesive layer 132 between the first separator 130 and the second separator 140 on opposite sides of the cathode electrode 110, and adhesive layer 132 between the second separator 140 on the uppermost layer and the first separator 130 covering one surface of the cathode electrode 110) located in a region overlapping the press 600 when seen in a plan view is formed at almost the same time. These adhesive layers 132 overlap each other when seen in a plan view.

In the present embodiment, it is also possible to obtain the same effect as that in the first embodiment.

As described above, although the embodiments of the present invention have been set forth with reference to the accompanying drawings, the embodiments are merely illustrative of the present invention, and various configurations other than those stated above may be adopted.

This application claims priority from Japanese Patent Application No. 2014-240551 filed on Nov. 27, 2014, the content of which is incorporated herein by reference in its entirety.

The invention claimed is:

1. A battery comprising:
   a first electrode having a first surface and a second surface, the second surface being opposite to the first surface;
   a first separator covering and in direct contact with the first surface, the first separator being formed of a first resin having a melting point of a first temperature;
   a second separator covering and in direct contact with the second surface, the second separator being formed of a second resin having a melting point of a second temperature higher than the first temperature;
   a first adhesive layer formed by melting a portion of the first separator, and pasting the first separator and the second separator to each other;
   a second electrode different from the first electrode in polarity, the second electrode having a third surface and a fourth surface, the fourth surface being a surface opposite to the third surface;
   a third separator covering and in direct contact with the third surface, the third separator being formed of the first resin having a melting point of the first temperature;
   a fourth separator covering and in direct contact with the fourth surface, the fourth separator being formed of the second resin having a melting point of the second temperature; and
   a second adhesive layer formed by melting a portion of the third separator, and pasting the third separator and the fourth separator to each other,
   wherein the first separator, the first electrode, the second separator, the third separator, the second electrode, and the fourth separator are laminated in this order, and
   wherein the second separator and the third separator are in direct contact with each other.

* * * * *